United States Patent

Kakugo et al.

[11] Patent Number: 5,280,000
[45] Date of Patent: Jan. 18, 1994

[54] CATALYST FOR OLEFIN POLYMERIZATION AND PROCESS FOR PRODUCING OLEFIN POLYMER USING THE CATALYST

[75] Inventors: Masahiro Kakugo, Narashino; Tatsuya Miyatake, Ichihara; Yoshio Kawai, Chiba; Akinobu Shiga; Kooji Mizunuma, both of Ichihara, all of Japan

[73] Assignee: Sumitomo Chemical Company, Limited, Osaka, Japan

[21] Appl. No.: 746,157

[22] PCT Filed: Oct. 9, 1986

[86] PCT No.: PCT/JP86/00515

§ 371 Date: May 29, 1987

§ 102(e) Date: May 29, 1987

[87] PCT Pub. No.: WO87/02370

PCT Pub. Date: Apr. 23, 1987

Related U.S. Application Data

[63] Continuation of Ser. No. 574,518, Aug. 28, 1990, abandoned, which is a continuation of Ser. No. 323,258, Mar. 13, 1989, abandoned, which is a continuation of Ser. No. 57,933, May 29, 1987, abandoned.

[30] Foreign Application Priority Data

Oct. 11, 1985 [JP] Japan ................. 60-227589
Oct. 30, 1985 [JP] Japan ................. 60-243523

[51] Int. Cl.$^5$ ........................ C08F 4/649; C08F 10/00
[52] U.S. Cl. .................... 502/121; 502/122; 502/123; 502/125; 502/126; 526/140; 526/141; 526/142; 526/139; 526/165

[58] Field of Search ............... 502/121, 122, 123, 127, 502/125, 126

[56] References Cited

U.S. PATENT DOCUMENTS

| | | | |
|---|---|---|---|
| 3,242,099 | 3/1966 | Manyik et al. | 526/165 |
| 3,300,458 | 1/1967 | Manyik et al. | |
| 4,490,514 | 12/1984 | Hoff et al. | 526/165 |
| 4,525,556 | 6/1985 | Coleman et al. | 526/142 |
| 4,680,353 | 7/1987 | Ishihara et al. | 526/138 |
| 4,701,432 | 10/1987 | Wilburn | 502/103 |

FOREIGN PATENT DOCUMENTS 58-19309 2/1983 Japan.
58-65708 4/1983 Japan.
60-35005 2/1985 Japan.

*Primary Examiner*—Edward J. Smith
*Attorney, Agent, or Firm*—Stevens, Davis, Miller & Mosher

[57] ABSTRACT

The present invention relates to a novel catalyst used for homopolymerization of an olefin of 2 or more carbon atoms or for copolymerization of two or more olefins of 2 or more carbon atoms, as well as to a process for producing an olefin polymer using said catalyst. High molecular olefin polymers can be produced at a high yield, by homopolymerizing an olefin or copolymerizing olefins using a catalyst system consisting of a transition metal compound of the general formula $M(R)_l(OR')_m X_{n-(l+m)}$ and an aluminoxane or a catalyst system comprising a transition metal compound of the general formula $M(R)_l(OR')_m X_{n-(l+m)}$, an aluminoxane and an organic compound having at least 2 hydroxyl groups.

19 Claims, No Drawings

CATALYST FOR OLEFIN POLYMERIZATION AND PROCESS FOR PRODUCING OLEFIN POLYMER USING THE CATALYST

This application is a continuation of application Ser. No. 07/574,518, filed Aug. 28, 1990, now abandoned, which in turn is a continuation of application Ser. No. 07/323,258, filed Mar. 13, 1989, now abandoned, which in turn is a continuation of application Ser. No. 07/057,933, filed May 29, 1987, now abandoned.

TECHNICAL FIELD

The present invention relates to a catalyst for olefin polymerization (homopolymerization olefin of 2 or more carbon atoms or copolymerization of two or more olefins of 2 or more carbon atoms), as well as to a process for producing an olefin polymer using said catalyst. More particularly, the present invention relates to a catalyst system comprising a transition metal compound having a particular structure and a aluminoxane, as well as to a process for producing a high molecular olefin polymer at a high efficiency by using said catalyst system.

BACKGROUND ART

Conventional processes for producing olefin polymers generally employ a catalyst system consisting of a solid titanium compound (composed mainly of titanium trichloride) and an organoaluminum compound, or a catalyst system comprising a solid which is titanium tetrachloride supported on magnesium chloride, an organoaluminum compound and an electron-donating compound. Also, there is proposed a process using a polymerization catalyst consisting of a cyclopentadienyl compound of titanium, zirconium or hafnium and an aluminoxane [e.g. Japanese Patent Application Kokai (Laid-Open) No. 19309/1983 (U.S. Pat. No. 4,542,199), Japanese Patent Application Kokai (Laid-Open) No. 217209/1985]. These processes using said polymerization catalysts are defective in that the olefin polymers, particularly, the propylene polymer obtained has a small molecular weight.

Meanwhile, a process for producing olefin polymers is proposed which uses, as part of the catalyst components, $Ti(OR)_nX_{4-n}$ and an aromatic hydrocarbon compound having at least 1 hydroxyl group (U.S. Pat. No. 4,525,556). The catalyst system used in this process, however, further requires, as other essential catalyst components, $MgR_2$ and an inorganic or organic halogen compound and furthermore requires, as an organoaluminum compound, $AlR_nX_{n'}$ (wherein R is a hydrocarbon group, X is halogen, n and n' are each a value of 0 to 3 and $n+n'=3$).

DISCLOSURE OF THE INVENTION

The object of the present invention is to solve the above mentioned problems and to provide a process for producing a high molecular olefin polymer with a high efficiency by using a novel catalyst system.

The present invention relates to (1) a catalyst for olefin polymerization comprising:

a catalyst component (A) which is a transition metal compound represented by the general formula $M(R)_l(OR')_mX_{n-(l+m)}$ (wherein M represents a transition metal atom; R and R' each represents a hydrocarbon group of 1 to 20 carbon atoms; X represents a halogen atom; l, m and n represent numbers satisfying $l \geq 0$, $m > 0$ and $n-(l+m) \geq 0$; and n corresponds to the valency of the transition metal), and a catalyst component (B) which is an aluminoxane obtained by the reaction of a trialkylaluminum and water, and (2) a catalyst for olefin polymerization comprising:

a catalyst component (A) which is a transition metal compound represented by the general formula $M(R)_l(OR')_mX_{n-(l+m)}$ (wherein M represents a transition metal atom; R and R' each represents a hydrocarbon group of 1 to 20 carbon atoms; X represents a halogen atom; l, m and n represent numbers satisfying $l \geq 0$, $m > 0$ and $n-(l+m) \geq 0$; and n corresponds to the valency of the transition metal), a catalyst component (B) which is an aluminoxane obtained by the reaction of a trialkylaluminum and water, and a catalyst component (C) which is an organic compound having at least 2 hydroxyl groups, represented by the general formula (I), (II), (III), (IV), (V) or (VI)

HO—R''—(Y)$_{n'}$—R'''—OH    (I)

(II)

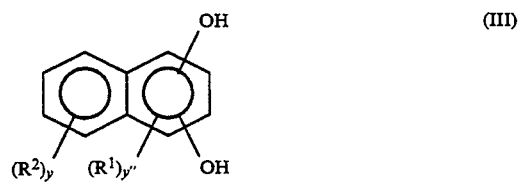

(III)

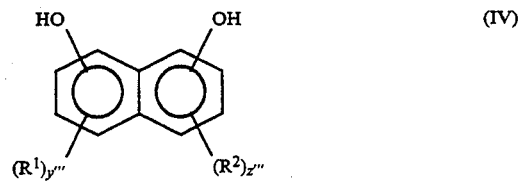

(IV)

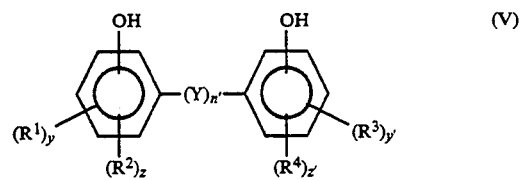

(V)

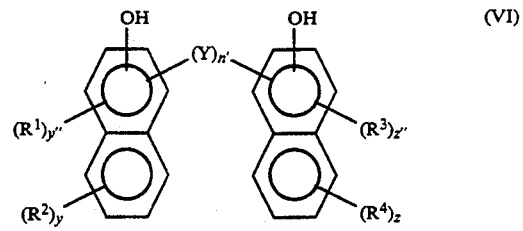

(VI)

[wherein R'' and R''' each represents a hydrocarbon group of 1 to 20 carbon atoms; Y represents a hydrocarbon group of 1 to 20 carbon atoms, —O—, —S—, —S—S—,

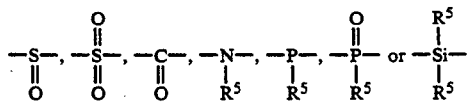

(wherein $R^5$ represents hydrogen or a hydrocarbon group of 1 to 6 carbon atoms); $R^1$, $R^2$, $R^3$ and $R^4$ each represents a hydrocarbon group of 1 to 20 carbon atoms, a hydroxyl group, a nitro group, a nitrile group, a hydrocarbyloxy group or a halogen atom, and $R^1$, $R^2$, $R^3$ and $R^4$ may be same or different; n' is 0 or an integer of 1 or larger and represents the times of repetition of the unit Y; y, y', y'', Y''', z, z', z'' and z''' each represents the number of a substituent bonding to an aromatic ring, y, y', z and z' each represents 0 or an integer of 1 to 4, y'' and z'' each represents 0 or an integer of 1 to 2, and Y''' and z', z'' and z''' each represents 0 or an integer of 1 to 3], as well as to a process for producing an olefin polymer, characterized by homopolymerizing an olefin of 2 or more carbon atoms or copolymerizing two or more olefins of 2 or more carbon atoms by using the catalyst system (1) or (2).

BEST MODE FOR CARRYING OUT THE INVENTION

The present invention will be explained in detail below.

In the transition metal compound represented by the general formula $M(R)_l(OR')_m X_{n-(l+m)}$ which is used as the catalyst component (A) in the present invention, specific examples of M include titanium, zirconium, hafnium, vanadium, etc. Of these, titanium and zirconium, in particular, give preferable results.

R and R' are each a hydrocarbon group of 1 to 20 carbon atoms. Of these, alkyl groups of 2 to 18 carbon atoms and aryl groups of 6 to 18 carbon atoms can be used preferably.

As specific examples of R and R', there can be mentioned alkyl groups such as methyl, ethyl, n-propyl, isopropyl, n-butyl, isobutyl, t-butyl, n-amyl, isoamyl, n-hexyl, n-heptyl, n-octyl, n-decyl, n-dodecyl and the like; aryl groups such as phenyl, naphthyl and the like; cycloalkyl groups such as cyclohexyl, cyclopentyl and the like; allyl groups such as propenyl and the like; aralkyl groups such as benzyl and the like; and so forth.

Of these, groups such as methyl, ethyl, phenyl, benzyl and the like are preferably used as R. As R', alkyl groups such as n-propyl, isopropyl, n-butyl, t-butyl and the like, as well as aryl groups such as phenyl and the like can be used preferably.

As examples of the halogen atom represented by X, there can be mentioned chlorine, bromine and iodine. Chlorine, in particular, can be used preferably.

l, m and n are numbers satisfying $l \geq 0$, $m > 0$ and $n - (l + m) \geq 0$, in the catalyst system (1).

Meanwhile, l, m and n are numbers satisfying $l \geq 0$, $m \geq 0$ and $n - (l+m) \geq 0$, in the catalyst system (2). Therefore, a compound of m=0, for example, titanium tetrachloride or zirconium tetrachloride can be used as the catalyst component (A), in the catalyst system (2) comprising the catalyst component (A) which is a transition metal compound, the catalyst component (B) which is an aluminoxane and the catalyst component (C) which is an organic compound having at least 2 hydroxyl groups. Meanwhile, in the catalyst system (1) consisting of the catalyst component (A) and the catalyst component (B), the presence of hydrocarbyloxy group is essential.

As specific examples of the catalyst component (A), there can be mentioned titanium tetrachloride, zirconium tetrachloride, tetraisoporpoxytitanium, tetra-n-butoxytitanium, tetra-t-butoxytitanium, diphenoxytitanium dichloride, dinaphthaoxytitanium dichloride, tetraiospropoxyzirconium, tetra-n-butoxyzirconium, tetra-t-butoxyzirconium, etc.

The aluminoxane which is the catalyst component (B) is a polymer of an aluminum compound and is a linear compound represented by the general formula $R^a[Al(R^a)O]_n-AlR^a_2$ and/or a cyclic compound represented by the general formula $[Al(R^a)O]_{n+1}$. In these formulas, $R^a$ is an alkyl group of 1 to 10 carbon atoms such as methyl, ethyl, propyl, butyl, pentyl or the like. Particularly, methyl and ethyl groups are preferable. n is an integer of 1 or larger. Particularly, 1 to 20 are preferable.

The aluminoxane can be obtained according to various ordinary methods. In one method, it can be synthesized by contacting a trialkylaluminum dissolved in an appropriate hydrocarbon solvent, with water. In this case, it is preferable that water be contacted with an aluminum compound in a mild condition. There are other methods such as a method of contacting steam with an aluminum compound solution and a method of slowly dropping a water-saturated organic solvent to an aluminum compound solution. Also, there is a method wherein copper sulfate hydrate ($CuSO_4.5H_2O$) or aluminum sulfate hydrate [$Al_2(SO_4)_3.18H_2O$] is reacted with an aluminum compound.

When an aluminoxane is synthesized from trimethylaluminum and water, it is common that a linear compound and a cyclic compound are obtained together.

With respect to the mole ratio of the raw materials of the aluminoxane, it is preferable that the aluminum compound and water be used in equal moles.

In the compound represented by the general formula (I), (II), (III), (IV), (V) or (VI)

$$HO-R''-(Y)_{n'}-R'''-OH \qquad (I)$$

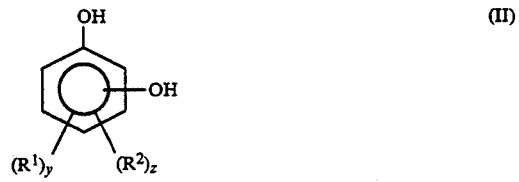

(II)

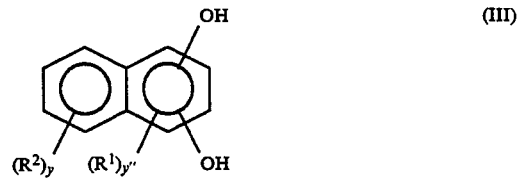

(III)

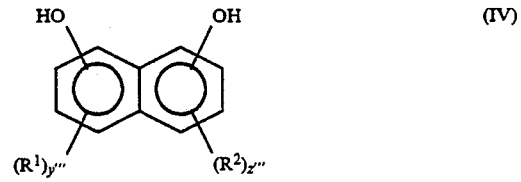

(IV)

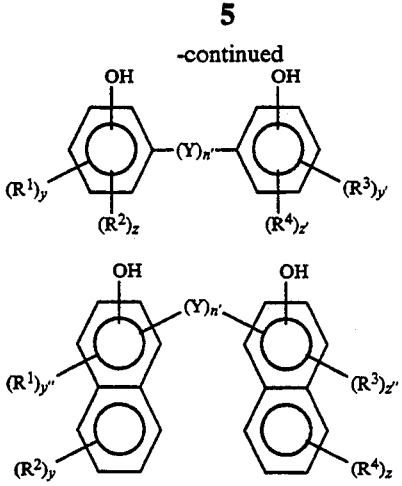

which is used as the catalyst component (C) in the present invention, R″ and R‴ are each a hydrocarbon group of 1 to 20 carbon atoms, and Y is a hydrocarbon group of 1 to 20 carbon atoms, —O—, —S—, —S—S—,

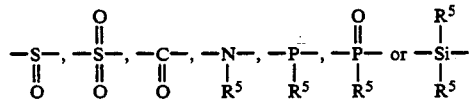

(wherein $R^5$ represents a hydrocarbon group of 1 to 6 carbon atoms). As the hydrocarbon groups of 1 to 20 carbon atoms represented by R″, R‴ and Y, there can be mentioned, for example, groups such as methylene, ethylene, trimethylene, propylene, diphenylmethylene, ethylidene, n-propylidene, isopropylidene, n-butylidene and isobutylidene. Of these, methylene, ethylene, ethylidene, isopropylidene and isobutylidene groups are used preferably. n′ is 0 or an integer of 1 or larger and represents the times of repetition of the unit Y. Particularly, 0 or 1 gives a preferable result.

$R^1$, $R^2$, $R^3$ and $R^4$ each represents a hydrocarbon group of 1 to 20 carbon atoms, a hydroxyl group, a nitro group, a nitrile group, a hydrocarbyloxy group of a halogen atom. As examples of the hydrocarbon group of 1 to 20 carbon atoms, there can be mentioned alkyl groups such as methyl, ethyl, n-propyl, isopropyl, n-butyl, isobutyl, t-butyl, n-amyl, isoamyl, n-hexyl, n-heptyl, n-octyl, n-decyl, n-dodecyl and the like; aryl groups such as phenylnaphthyl and the like; cycloalkyl groups such as cyclohexyl, cyclopentyl and the like; allyl groups such as propenyl and the like; and aralkyl groups such as benzyl and the like. Of these, alkyl groups of 1 to 10 carbon atoms can be used preferably.

y, y′, y″, Y‴, z, z′, z″ and z‴ each represents the number of a substituent bonding to an aromatic ring. y, y′, z and z′ each represents 0 or an integer of 1 to 4; y″ and z″ each represents 0 or an integer of 1 to 2; and Y‴ and z‴ each represents 0 or an integer of 1 to 3.

As specific examples of the catalyst component (C), there can be mentioned 2,4-dihydroxypentane, 2-(2-hydroxypropyl)phenol, catechol, resorcinol, 4-isopropylcatechol, 3-methoxycatechol, 1,8-dihydroxynaphthalene, 1,2-dihydroxynaphthalene 2,2′-biphenyldiol, 1,1′-bi-2-naphthol, 2,2′-dihydroxy-6,6′-dimethylbiphenyl, 4,4′,6,6′-tetra-t-butyl-2,2,-methylenediphenol, 4,4′-dimethyl-6,6′-di-t-butyl-2,2′-methylenediphenol, 4,4′,6,6′-tetramethyl-2,2′-isobutylidenediphenol, 2,2′-dihydroxy-3,3′-di-t-butyl-5,5′-dimethyldiphenyl sulfide, etc. Of these, 2,4-dihydroxypentane, catechol, 2,2′-biphenyldiol, 1,1′-bi-2-naphthol, 4,4′,6,6′-tetra-t-butyl-2,2′-methylenediphenol, 4,4′-dimethyl-6,6′-di-t-butyl-2,2′-methylenediphenol, 4,4′,6,6′-tetramethyl-2,2′-isobutylidenediphenol and 2,2′-dihydroxy-3,3′-di-t-butyl-5,5′-dimethyldiphenyl sulfide give preferable results.

In application of these catalyst systems to olefin polymerization, only the catalyst components (A) and (B) or the catalyst components (A), (B) and (C) can be used. In polymerization of, for example, propylene, the use of the catalyst components (A) and (B) produces mainly an atactic (amorphous) polymer of very high molecular weight and no stereoregularity, while the use of the catalyst components (A), (B) and (C) produces a crystalline polymer of isotactic stereoregularity depending upon the type of the catalyst component (C).

With respect to the addition amount of each catalyst component, in the case of, for example, solvent polymerization, the catalyst component (A) can be used in a range of $10^{-10}$ to $10^3$ mmol/l, preferably $10^{-7}$ to $10^2$ mmol/l in terms of transition metal atom.

The catalyst component (B) can be used in a ratio of aluminum atom to transition metal atom of the catalyst component (A), of 1–100,000, preferably 10–10,000.

The catalyst component (C) can be used in a mole ratio to transition metal atom of the catalyst component (A), of 0.01–4.

It is necessary that the catalyst component (C) is allowed to react, before its use in polymerization, with the catalyst component (A). The reaction can be effected at temperatures of $-20°$ to $200°$ C. in a hydrocarbon or halogenated hydrocarbon solvent. The catalyst component (C) can be directly reacted with the catalyst component (A); however, when the catalyst component (A) is a halogen-containing transition metal compound, it is possible to add, to the reaction system, ammonia, pyridine, an alkylamine or the like in order to capture hydrogen halide which generates during the reaction. In this case, it is preferable that the reaction product is used in polymerization after the hydrogen halide-containing compound precipitated have been removed. It is also possible that the catalyst component (C) is allowed to react with an alkali metal (e.g. metallic sodium) or its hydride (e.g. lithium hydride) to synthesize a metal alcholate, a metal phenolate, a metal naphtholate or the like and this synthesized product is allowed to react with the catalyst component (A). In this case, it is preferable that the synthesized product is used in polymerization after the alkali metal salt precipitated has been removed. It is moreover possible that when the catalyst component (A) contains hydrocarbyloxy group, the catalyst component (C) is allowed to react with a carboxylic acid (e.g. acetic acid) to obtain an ester compound and this ester compound is subjected to reaction with the catalyst component (A).

When a transition metal compound and an organic compound having at least 2 hydroxyl groups are reacted, the reaction product is believed to have a structure in which the at least 2 hydroxyl groups of said organic compound bonded to one transition metal atom.

The olefins to which the present invention can be applied are those having 2 to 10 carbon atoms. Specific examples of the olefins are ethylene, propylene, butene-1, pentene-1, 4-methylpentene-1, hexene-1, octene-1, vinylcyclohexane, etc. These compounds can be subjected to homopolymerization as well as to copolymerization of two or more olefins. The olefins usable in the present invention should not be restricted to those mentioned above.

The polymerization method should not be restricted to a particular one, either. There can be used, for example, solvent polymerization using a aliphatic hydrocarbon solvent (e.g. butane, pentane, hexane, heptane, octane), an aromatic hydrocarbon solvent (e.g. benzene, toluene) or a halogenated hydrocarbon solvent (e.g. methylene chloride); solution polymerization; bulk polymerization using a monomer (monomers) as a solvent; and gas phase polymerization conducted in gaseous monomer(s). Any of continuous polymerization and batch polymerization can be used.

The polymerization temperature can vary in a range of $-50°$ to 200° C. Particularly, a temperature range of $-20°$ to 100° C. is preferred. As the polymerization pressure, normal pressure to 60 kg/cm$^2$G is preferred. The polymerization time is generally determined appropriately depending upon the type of polymer desired and the reactor used; however, it can vary from 5 minutes to 40 hours. For example, 5 minutes to 10 hours is preferred in ethylene polymerization and 30 minutes to 20 hours is preferred in propylene polymerization.

EXAMPLE

Next, the effects of the present invention will be explained specifically by way of Examples of the present invention and Comparative Examples. However, the present invention is in no way restricted by these Examples.

In the Examples each molecular weight was shown as an intrinsic viscosity $[\eta]$ or as a weight-average molecular weight calculated using gel permeation chromatography (GPC).

The measurement of $[\eta]$ was conducted at 135° C. for a tetralin solution.

In GPC, Model 150C, an apparatus manufactured by Waters was used. The measurement was conducted at 140° C. using o-dichlorobenzene as a solvent. Three Shodex 80M/S columns were used. For preparation of a calibration curve, there were used 14 kinds of monodisperse standard polystyrene whose molecular weights ranged from 500 to $6.8 \times 10^6$. The molecular weight of each polymer obtained was shown as a weight-average molecular weight calculated from an average molecular weight in terms of styrene according to the Universal method.

The isotactic stereoregularity of polymer obtained in propylene polymerization was evaluated by measuring the presence of isotactic crystalline band at 997 cm$^{-1}$ in the IR spectrum, or by using an isotactic triad mole fraction (hereinafter referred to as [mm] fraction) calculated from the $^{13}$C NMR spectrum. The measurement was conducted at 135° C. using a FX-100 Spectrometer manufactured by Nihon Denshi. Incidentally, the polymer sample was dissolved in o-dichlorobenzene. The [mm] fraction was calculated from the enlarged spectrum of the methyl carbon region.

EXAMPLE 1

(1) Synthesis of Methylaluminoxane [catalyst component (B)]

A flask having an internal volume of 0.5 liter, equipped with a stirrer, a dropping funnel and a reflux condenser was purged with argon. Therein was placed 200 ml of toluene. Then, 38.2 g (0.15 mole) of CuSO$_4$.5-H$_2$O was added and suspended in the toluene. While the contents of the flask was maintained at 25° C. and stirred, a solution consisting of 0.58 mole of trimethylaluminum and 100 ml of toluene was added dropwise in 5 hours. After the completion of the dropwise addition, stirring was continued for 20 hours at room temperature. The precipitate formed was removed, after which the solvent was removed under vacuum to obtain 14.3 g of methylaluminoxane. This aluminoxane was used in polymerization after dilution with toluene (0.1 g/ml). The aluminoxane synthesized in this Example was used also in Examples 2 to 5 and Comparative Example 2.

(2) Polymerization of Propylene

A stainless steel autoclave having an internal volume of 130 ml, of magnetic stirrer mixing type was purged with argon. Thereinto were charged 500 $\mu$l of a toluene solution containing tetra-n-butoxytitanium as a catalyst component (A) (the solution contained $8.62 \times 10^{-6}$ mole of titanium), 3 ml of methylaluminoxane and 80 ml of liquefied propylene.

The autoclave was kept at 30° C. for 1 hour with stirring. Excessive propylene was released out, after which the polymer formed was recovered.

The polymer was washed with 1 N HCl dissolved in methanol, followed by washing with methanol and drying. The resulting polymer weighed 0.78 g, which corresponded to a catalyst activity of $9.4 \times 10^4$ g of polymer per mole of titanium atom. This polymer had an $[\eta]$ of 3.5 and was found from the IR spectrum to be an amorphous polypropylene.

EXAMPLE 2

Polymerization was conducted in the same manner as in Example 1 except that 50 $\mu$l of a tetra-n-butoxytitanium solution containing $8.62 \times 10^{-7}$ mole of titanium was used as a catalyst component (A) and a polymerization temperature of 60° C. was employed. The resulting polymer weighed 0.32 g, which corresponded to a catalyst activity of $3.7 \times 10^5$ g of polymer per mole of titanium atom. This polymer had an $[\eta]$ of 2.2 and was found from the IR spectrum to be an amorphous polypropylene.

EXAMPLE 3

Polymerization was conducted in the same manner as in Example 1 except that 5 ml of a tetra-n-butoxytitanium solution containing $8.62 \times 10^{-5}$ mole of titanium was used as a catalyst component (A) and a polymerization time of 4 hours was employed. The resulting polymer weighed 1.33 g. This polymer had an $[\eta]$ of 6.1 and was found from the IR spectrum to be an amorphous polypropylene.

EXAMPLE 4

Polymerization was conducted in the same manner as in Example 1 except that 500 $\mu$l of a tetraisopropoxytitanium solution containing $1.01 \times 10^{-5}$ mole of titanium was used as a catalyst component (A) in place of the tetra-n-butoxytitanium solution. The resulting polymer weighed 2.3 g. This polymer had an $[\eta]$ of 2.5 and was found from the IR spectrum to be an amorphous polypropylene.

EXAMPLE 5

Polymerization was conducted in the same manner as in Example 1 except that 500 $\mu$l of a diphenoxytitanium dichloride solution containing $9.2 \times 10^{-6}$ mole of titanium was used as a catalyst component (A) in place of tetra-n-butoxytitanium and a polymerization time of 4 hours was employed. The resulting polymer weighed 2.9 g. This polymer had an [η] of 2.1 and was found from the IR spectrum to be an amorphous polypropylene.

COMPARATIVE EXAMPLE 1

Polymerization was conducted in the same manner as in Example 1 except that 18 ml of a toluene solution of ethylaluminum sesquichloride (0.29 mmol/ml solution) was used in place of methylaluminoxane as a catalyst component (B). The resulting polymer weighed 2 mg. Therefore, the catalyst system used had a low activity.

COMPARATIVE EXAMPLE 2

Polymerization was conducted in the same manner as in Example 1 except that $8.6 \times 10^{-7}$ mole of biscyclopentadienyltitanium dichloride was used in place of tetra-n-butoxytitanium as a catalyst component (A). The resulting polymer weighed 0.28 g. This polymer had an [72] of 0.03 and was a sticky amorphous polypropylene.

EXAMPLE 6

(1) Reaction of Catalyst Components (A) and (C)

A flask having an internal volume of 500 ml, equipped with a stirrer, a dropping funnel and a reflux condenser was purged with methylene. 100 ml of methylene chloride and 0.015 mole of titanium tetrachloride were placed in the flask and they were heated until methylene chloride was refluxed. Then, a solution consisting of 200 ml of methylene chloride and 0.015 mole of 1,1'-bi-2-naphthol was dropped from the dropping funnel slowly in 3 hours. After the completion of the dropping, stirring was continued for 1 hour under refluxing. The reaction mixture was allowed to stand overnight and filtered to remove the precipitate formed, whereby a uniform black solution was obtained. This solution contained 0.04 mmole/ml of titanium.

(2) Synthesis of Catalyst Component (B)

A flask having an internal volume of 0.5 liter, equipped with a stirrer, a dropping funnel and a reflux condenser was purged with argon. 200 ml of toluene was placed in the flask. Then, 38.2 g (0.15 mole) of CuSO$_4$.5H$_2$O was added and suspended in toluene. While the content of the flask was maintained at 25° C. and stirred, a solution consisting of 0.58 mole of trimethylaluminum and 100 ml of toluene was added dropwise in 5 hours. After the completion of the dropwise addition, stirring was continued for 20 hours at room temperature.

The precipitate was removed. Then, the solvent was removed under vacuum to obtain 12.0 g of methylaluminoxane. This methylaluminoxane was used in polymerization after dilution with toluene (0.1 g/ml). This aluminoxane solution was used also in polymerizations of Examples 8 to 13 and Comparative Example 3.

(3) Polymerization of Propylene

A stainless steel autoclave having an internal volume of 130 ml, of magnetic stirrer mixing type was purged with argon. Thereinto were charged 0.1 ml of the reaction solution of the catalyst components (A) and (C) obtained in the above (1), 3 ml of the catalyst component (B) obtained in the above (2) and 80 ml of liquified propylene.

The autoclave was kept at 20° C. for 1 hour with stirring. Excessive propylene was released out, after which the polymer formed was recovered.

The polymer was washed with 1 N HCl dissolved in methanol, followed by washing with methanol and drying. The resulting polymer weighed 0.25 g, which corresponded to a catalyst activity of 62.5 g of polymer per mmole of titanium. This polymer had a molecular weight of 314,000 and a [mm] fraction of 0.55.

EXAMPLE 7

In the synthesis of catalyst component (B) in Example 6, trimethylaluminum was replaced by triethylaluminum to synthesize ethylaluminoxane. Using a toluene solution of this ethylaluminoxane (0.1 g/ml) and 0.5 ml of the reaction solution of the catalyst components (A) and (C) obtained in Example 6, propylene polymerization was conducted in the same manner as in Example 6. The resulting polymer weighed 146 mg. This polymer had a molecular weight of 274,000 and a [mm] fraction of 0.49.

EXAMPLE 8

(1) Reaction of Catalyst Components (A) and (C)

A uniform black solution was obtained in the same manner as in the reaction of catalyst components (A) and (C) of Example 6 except that 0.015 mole of 2,2'-biphenyldiol was used in place of 1,1'-bi-2-naphthol.

This solution contained 0.027 mmole/ml of titanium.

(2) Polymerization of Propylene

Polymerization was conducted in the same manner as in Example 6 except that 10 ml of the reaction solution of catalyst components (A) and (C) and 9 ml of the same catalyst component (B) were used. The catalyst activity was 15.0 g of polymer per mmole of titanium. The polymer obtained had a molecular weight of 191,000 and a [mm] fraction of 0.50.

EXAMPLE 9

A flask having an internal volume of 200 ml, equipped with a stirrer and a thermometer was purged with argon. Thereinto were charged 60 ml of methylene chloride, 20 ml of the reaction solution of catalyst components (A) and (C) obtained in Example 6 and 1.5 ml of the catalyst component (B) obtained in Example 6. The temperature inside the flask was maintained at 25° C.; the inside gas of the flask was replaced by propylene; and the pressure inside the flask was kept at 0.1 kg/cm$^2$G. Under this condition, polymerization was conducted for 2 hours. The flask inside was purged again with argon; 1 N HCl dissolved in methanol was added; and stirring was continued for 0.5 hour. The toluene layer was evaporated to dryness to recover 1.9 g of a polymer. This polymer had a molecular weight of 258,000 and a [mm] fraction of 0.55.

EXAMPLE 10

(1) Reaction of catalyst components (A) and (C)

A flask having an internal volume of 500 ml, equipped with a stirrer, a dropping funnel and a reflux condenser was purged with argon. Therein were placed 100 ml of methylene chloride and 0.01 mole of zirconium tetrachloride. They were heated until methylene chloride refluxed.

Then, a solution consisting of 100 ml of toluene and 0.01 mole of 4,4′,6,6′-tetra-t-butyl-2,2′-methylenediphenol was dropped from the dropping funnel slowly in 2 hours. After the completion of the dropping, stirring was continued for 50 hours under refluxing.

The reaction mixture was allowed to stand overnight and then filtered to remove the resulting precipitate to obtain a uniform brown solution. This solution contained 0.009 mmole/ml of zirconium.

(2) Polymerization of Propylene

Polymerization was conducted in the same manner as in Example 6 except that 1 ml of the reaction solution of catalyst components (A) and (C) obtained in the above (1) was charged. The resulting polymer weighed 0.15 g and had a molecular weight of 309,000 and a [mm] fraction of 0.73.

EXAMPLE 11

(1) Reaction of catalyst components (A) and (C)

A flask having an internal volume of 100 ml, equipped with a stirrer, a dropping funnel and a reflux condenser was purged with argon. Therein were placed 20 ml of methylene chloride and 0.0028 mole of 4,4′,6,6′-tetramethyl-2,2′-isobutylidenediphenol. They were heated until methylene chloride was refluxed. Then, a methylene chloride solution containing 0.0028 mole of tetraisopropoxytitanium was dropped from the dropping funnel, and stirring was conducted for 1 hour under refluxing. The reaction mixture was subjected to vacuum to remove the solvent and then dried to obtain a reaction product. This reaction product was used in polymerization in a form of toluene solution ($4.3 \times 10^{-5}$ mole/ml).

(2) Polymerization of Propylene

Polymerization was conducted in the same manner as in Example 6 except that 1 ml of the reaction solution of catalyst components (A) and (C) obtained in the above (1) was charged. The resulting polymer weighed 0.41 g and had a molecular weight of 850,000 and a [mm] fraction of 0.53.

EXAMPLE 12

(1) Reaction of catalyst components (A) and (C)

Reaction was conducted in the same manner as in Example 11 except that 0.0028 mmole of tetraisopropoxyzirconium was used as a catalyst component (A) in place of tetraisopropoxytitanium, whereby a toluene solution ($4.0 \times 10^{-5}$ mole/ml) was obtained.

(2) Polymerization of Propylene

Polymerization was conducted in the same manner as in Example 6 except that 1 ml of the reaction solution of catalyst components (A) and (C) obtained in the above (1) was used and the polymerization temperature and time were 60° C. and 4 hours, respectively. The resulting polymer weighed 0.07 g and had a molecular weight of 730,000 and a [mm] fraction of 0.70.

EXAMPLE 13

(1) Reaction of catalyst components (A) and (C)

Reaction was conducted in the same manner as in Example 11 except that 0.0028 mmole of tetra-t-butoxyzirconium was used as a catalyst component (A) in place of tetraisopropoxytitanium, whereby a toluene solution ($6.0 \times 10^{-5}$ mole/ml) was obtained.

(2) Polymerization of Propylene

Polymerization was conducted in the same manner as in Example 6 except that 1 ml of the reaction solution of catalyst components (A) and (C) obtained in the above (1) was used and the polymerization temperature and time were 80° C. and 2 hours, respectively. The resulting polymer weighed 0.5 g. This polymer had a molecular weight of 500,000 and a [mm] fraction of 0.83.

COMPARATIVE EXAMPLE 3

Polymerization was conducted in the same manner as in Example 6 except that 3 ml of a toluene solution containing biscyclopentadienyltitanium dichloride ($1.2 \times 10^{-5}$ mole/ml) was used as a catalyst component (A). The resulting polymer weighed 3.6 g. This polymer had a low molecular weight of 2,800 and a [mm] fraction of 0.25 and was an amorphous polypropylene.

COMPARATIVE EXAMPLE 4

Polymerization was conducted in the same manner as in Example 9 except that $2.5 \times 10^{-3}$ mole of diethylaluminum chloride was used as a catalyst component (B). Only a trace amount of a polymer was obtained.

EXAMPLE 14

(1) Reaction of Catalyst Components (A) and (C)

A flask having an internal volume of 100 ml, equipped with a stirrer and a reflux condenser was purged with argon. Therein was placed 0.84 mmole of 2,2′-dihydroxy-3,3′-di-t-butyl-5,5′-dimethyldiphenyl sulfide. Then, 50 ml of dry n-butyl ether was added. They were stirred and made into a solution. To this solution was slowly added an n-butyl ether solution containing 0.84 mmole of titanium tetrachloride, using a syringe. Stirring was conducted at 25° C. for about 6 hours. After the reaction mixture had been allowed to stand, the supernatant was removed to recover a precipitate portion. Part of the precipitate was dissolved in toluene to prepare a solution containing 0.001 mmole/ml of titanium.

(2) Synthesis of Catalyst Component (B)

A flask having an internal volume of 500 ml, equipped with a stirrer, a dropping funnel and a reflux condenser was purged with argon. Therein was placed 200 ml of toluene. Then, 38.2 g (0.15 mole) of $CuSO_4 \cdot 5H_2O$ was added and suspended in toluene. While the flask contents was maintained at 5° C. and stirred, a solution consisting of 0.58 mole of trimethylaluminum and 100 ml of toluene was dropped in 5 hours. After the completion of the dropping, stirring was continued for 20 hours at room temperature. The precipitate was removed and then the solvent was removed under vacuum to obtain 10.0 g of methylaluminoxane. This aluminoxane was used in polymerization after dilution with toluene (0.05 g/ml). The aluminoxane solution was used also in polymerization of Examples 15 to 19 and Comparative Example 5.

(3) Polymerization of Ethylene

In a 100-ml flask were placed 50 ml of toluene, 3 ml (150 mg) of the catalyst component (B) and 1 ml (0.001 mmole) of the reaction solution of catalyst components (A) and (C) in this order. The mixture was heated to 30°

C. Then, ethylene was continuously fed into the flask and polymerization was conducted for 10 minutes at 0.2 kg/cm$^2$G. After the completion of the reaction, methanol was added to decompose the catalysts, followed by drying to obtain 0.35 g of a polyethylene. The catalyst activity was 2,100 g of polymer per mmole of titanium per hour. The resulting polymer had a molecular weight of 530,000.

EXAMPLE 15

A stainless steel autoclave having an internal volume of 130 ml, of magnetic stirrer mixing type was purged with argon. Therein were placed the reaction solution of catalyst components (A) and (C) (0.001 mmole) and 3 ml of the catalyst component (B), both prepared in Example 14, in this order. 40 g of propylene was fed into the autoclave and polymerization was conducted at 30° C. for 1 hour. After the completion of the reaction, propylene was purged and methanol was added to decompose the catalysts, followed by drying to obtain 3.9 g of a polymer. This polypropylene had a molecular weight of 1,800,000.

EXAMPLE 16

(1) Reaction of catalyst components (A) and (C)

In a flask having an internal volume of 100 ml, equipped with a stirrer was placed 0.9 mmole of 2,2'-dihydroxy-3,3'-di-t-butyl-5,5'-dimethyldiphenyl sulfide. The flask was purged with argon, after which 50 ml of dry n-butyl ether was added. The mixture was stirred and made into a solution. To this solution was added 0.9 mmole of tetraisopropoxytitanium. Stirring was conducted at 25° C. and in few to several minutes, a precipitate appeared. Stirring was continued for about 2 hours and the mixture was allowed to stand. The supernatant was removed, and the precipitate portion was recovered and washed. A part of this precipitate was dissolved in toluene to prepare a solution containing $9.1 \times 10^{-4}$ mmole/ml of titanium.

(2) Polymerization of Propylene

Polymerization was conducted in the same manner as in Example 15 except that 1 ml of the reaction solution of catalyst components (A) and (C) obtained in the above (1) was added, whereby 0.86 g of a polymer was obtained. This polymer had a molecular weight of 1,600,000.

COMPARATIVE EXAMPLE 5

(1) Polymerization of Propylene

Polymerization was conducted in the same manner as in Example 15 except that 0.0009 mmole of biscyclopentadienylhafnium dichloride was used as a catalyst component (A) and further the catalyst component (B) obtained in Example 14 was used, whereby 0.8 g of a polymer was obtained. The polymer had a low molecular weight of 19,000.

EXAMPLE 17

(1) Reaction of Catalyst Components (A) and (C)

A flask having an internal volume of 100 ml, equipped with a stirrer and a reflux condenser was purged with argon. Therein was placed 0.0053 mole of 2,4-dihydroxypentane. Thereto was added 30 ml of dry n-butyl ether. The mixture was stirred and made into a solution. To this solution was slowly added a n-butyl ether solution containing 0.0053 mole of titanium tetrachloride, using a syringe. Stirring was continued at 25° C. for about 10 hours. The reaction mixture was allowed to stand. The supernatant was removed and the precipitate portion was recovered. A part of the precipitate was dissolved in toluene to prepare a solution containing 0.0023 mmole/ml of titanium.

(2) Polymerization of Propylene

A stainless steel autoclave having an internal volume of 130 ml, of magnetic stirrer mixing type was purged with argon. Therein were placed the reaction solution (0.0023 mmole) of catalyst components (A) and (C) obtained in the above (1) and 3 ml of the catalyst component (B) obtained in Example 14, in this order. 40 g of propylene was fed into the autoclave and polymerization was conducted at 30° C. for 1 hour. After the completion of the reaction, propylene was purged and methanol was added to decompose the catalysts, followed by drying to obtain 0.15 g of a polymer. The resulting polypropylene had a molecular weight of 960,000 and was found from the IR spectrum to be an amorphous polypropylene.

EXAMPLE 18

(1) Reaction of catalyst components (A) and (C)

A flask having an internal volume of 100 ml, equipped with a stirrer and a reflux condenser was purged with argon. Therein was placed 0.0053 mole of catechol. Then, 30 ml of n-butyl ether was added, and the mixture was stirred and made into a solution. To this solution was slowly added a n-butyl ether solution containing 0.0053 mole of titanium tetrachloride, using a syringe. Stirring was conducted at 25° C. for about 6 hours. The reaction mixture was evaporated to dryness. A part of the residue was dissolved in toluene to prepare a solution containing 0.18 mmole/ml of titanium.

(2) Polymerization of Propylene

A stainless steel autoclave having an internal volume of 130 ml, of magnetic stirrer mixing type was purged with argon. Therein were placed the reaction solution (0.18 mmole) obtained in the above (1) and 3 ml of the catalyst component (B) obtained in Example 14, in this order. Thereinto was fed 40 g of propylene and polymerization was conducted at 30° C. for 1 hour. After the completion of the reaction, propylene was purged and methanol was added to decompose the catalysts, followed by drying to obtain 0.02 g of a polymer. The resulting polypropylene had a molecular weight of 510,000 and was found from the IR spectrum to be an amorphous polypropylene.

EXAMPLE 19

(1) Reaction of catalyst components (A) and (C)

A flask having an internal volume of 0.5 liter, equipped with a stirrer, a dropping funnel and a reflux condenser was purged with nitrogen. Therein were placed 100 ml of methylene chloride and 0.015 mole of titanium tetrachloride. They were heated until methylene chloride were refluxed. Then, a solution consisting of 200 ml of methylene chloride and 0.015 mole of 1,1' bi-2-naphthol was dropped from the dropping funnel slowly in 1 hour. After the completion of the dropping, stirring was continued for 5 hours under refluxing. The reaction mixture was allowed to stand overnight and then filtered to remove the precipitate formed to obtain a uniform black solution. This solution contained 0.04 mmole/ml of titanium.

(2) Synthesis of Catalyst Component (B)

A flask having an internal volume of 1 liter, equipped with a stirrer, a dropping funnel and a reflux condenser was purged with nitrogen. Therein was placed 400 ml of toluene. Then, 43.4 g (0.17 mole) of CuSO$_4$.5HO was added and suspended in toluene. While the content of the flask was maintained at 5° C. and stirred, a solution consisting of 0.58 mole of trimethylaluminum and 140 ml of toluene was dropped in 4 hours. Reaction was conducted at this temperature for 1 hour and then at 20° C. for 24 hours. The reaction mixture was allowed to stand over night. Subsequently, it was filtered to remove the precipitate formed and the filtrate was placed in vacuum to remove the solvent, whereby 11.3 g of methylaluminoxane was obtained. This aluminoxane was used in polymerization after dilution with toluene (0.1 g/ml).

(3) Copolymerization of Ethylene and Propylene

A 0.5-liter flask equipped with a reflux condenser was purged with argon. Therein were placed 200 ml of dry methylene chloride and 1 ml of the catalyst component (B) obtained in the above (2). A thermometer and a stirrer were attached to the flask, and the flask inside temperature was kept at 30° C. A mixed gas consisting of 50 mole % of ethylene and 50 mole % of propylene was passed through the flask inside at a flow rate of 3 liters (normal state)/minute for 10 minutes, whereby the mixed gas was dissolved. Then, 1 ml of the reaction solution of catalyst components (A) and (C) obtained in the above (1) was added and copolymerization was started. Polymerization was conducted for 1 hour at 30° C. with stirring while passing the above mixed gas. The polymer solution was poured into a large amount of methanol to recover a total amount of a copolymer. The copolymer weighed 1.55 g. This copolymer contained 23% by weight of propylene and had an $[\theta]$ of 8.4.

EXAMPLE 20

(1) Copolymerization of Ethylene and Propylene

A 0.5-liter flask equipped with a reflux condenser was purged with nitrogen. Therein were placed 200 ml of toluene and 1 ml of the catalyst component (B) obtained in Example 19 (2). A thermometer and a stirrer were attached to the flask, and the flask inside temperature was kept at 50° C. A mixed gas consisting of 40 mole % of ethylene and 60 mole % of propylene was passed through the flask inside at a flow rate of 3 liters (normal state)/minute for 10 minutes, whereby the mixed gas was dissolved. Then, a toluene solution containing 0.017 mmole of tetraisopropoxytitanium was added as a catalyst component (A), and copolymerization was started. Polymerization was conducted for 1 hour at 50° C. with stirring while passing the above mixed gas. The polymer solution was poured into a large amount of methanol to recover a total amount of a copolymer. The copolymer weighed 0.34 g. This copolymer contained 25% by weight of propylene and had an $[\eta]$ of 8.8.

INDUSTRIAL APPLICABILITY

The process of the present invention enables production of high molecular olefin polymers at a high efficiency. The present process has a very high industrial significance particularly in that high molecular amorphous olefin polymers whose production has hitherto been very difficult can be produced easily.

We claim:

1. A catalyst for olefin polymerization consisting of:
    a catalyst compound (A) which is a transition metal compound represented by the general formula $M(R)_l(OR')_m X_{n-(l+m)}$ (wherein M represents a transition metal atom selected from the group consisting of Ti, Zr, Hf and V; R and R' each represents a hydrocarbon group of 1 to 20 carbon atoms; X represents a halogen atom; l, m and n represent numbers satisfying $l \geq 0$, $m \geq 0$ and $n-(l-m) \geq 0$; and n corresponds to the valency of the transition metal),
    a catalyst component (B) which is an aluminoxane obtained by the reaction of a trialkylaluminum and water, and
    a catalyst compound (C) which is an organic compound having at least 2 hydroxyl groups, represents by the general formula (V) and (VI)

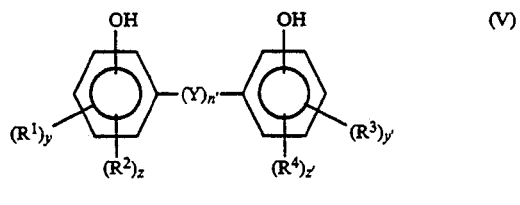

(V)

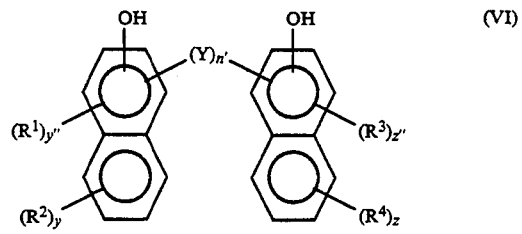

(VI)

(wherein Y represents —O—, —S—, —S—S—,

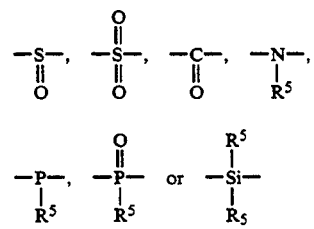

(wherein $R^5$ represents hydrogen or a hydrocarbon group of 1 to 6 carbon atoms); $R^1$, $R^2$, $R^3$ and $R^4$ each represents a hydrocarbon group of 1 to 20 carbon atoms, a hydroxyl group, a nitro group, a nitrile group, a hydrocarbyloxy group or a halogen atom, and $R^1$, $R^2$, $R^3$ and $R^4$ may be the same or different; n' is 0 or an integer of 1 or larger and represents the times of repetition of the unit Y; y, y' and y", z, z' and z" each represents the number of a substituent bonding to an aromatic ring, y, y', z and z' each represents 0 or an integer of 1 to 4, y" and z" each represents 0 or an integer of 1 to 2 wherein component (C) is prereacted with component (A), the ratio of component (A) to component (C) being 1:1, and the ratio of Al to the transition metal (M) being 10–10,000.

2. A catalyst for olefin polymerization according to claim 1, wherein in the catalyst component (A), the M of the transition metal compound represented by the general formula $M(R)_l(OR')_mX_{n-(l+m)}$ is titanium or zirconium.

3. A catalyst for olefin polymerization according to claim 1, wherein in the catalyst component (A), the M of the transition metal compound represented by the general formula $M(R)_l(OR')_mX_{n-(l+m)}$ is titanium or zirconium, $l=0$, $m>0$ and $n-m \geq 0$.

4. A catalyst for olefin polymerization accoriding to claim 1, wherein in the catalyst component (A), the general formula $M(R)_l(OR')_mX_{n-(l+m)}$ is titanium tetrachloride or zirconium tetrachloride.

5. A catalyst for olefin polymerization according to claim 1, wherein in the catalyst component (A), the R and R' of the general formula $M(R)_l(OR')_mX_{n-(l+m)}$ are each an alkyl group or an aryl group.

6. A catalyst for olefin polymerization according to claim 1, wherein in the catalyst component (A), the R is a methyl, ethyl, phenyl or benzyl group and the R' is an n-propyl, isopropyl, n-butyl, t-butyl or a phenyl group.

7. A catalyst for olefin polymerization according to claim 1, wherein in the catalyst component (A), the general formula $M(R)_l(OR')_mX_{n-(l+m)}$ is tetraisopropoxytitanium, tetra-n-butoxytitanium, tetra-t-butoxytitanium, diphenoxytitanium dichloride, dinaphthoxytitanium dichloride, tetraisopropoxyzirconium, tetra-n-butoxyzirconium or tetra-t-butoxyzirconium.

8. A catalyst for olefin polymerization according to claims 1, 2, 3, 4, 5, 6 or 7, wherein in the catalyst component (B), the trialkylaluminum is trimethylaluminum or triethylaluminum.

9. A catalyst for olefin polymerization according to claims 1, 2, 3, 4, 5, 6 or 7, wherein the catalyst component (C) is a compound represented by the general formula

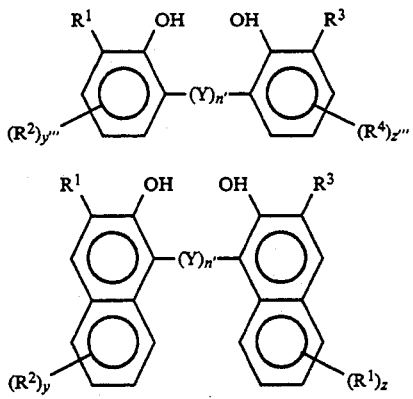

wherein y''' and z''' are 0 or an integer from 1 to 3.

10. A catalyst for olefin polymerization according to claim 9, wherein the catalyst component (C) is a compound in which the y, y''', z and z''' are 1, respectively.

11. A catalyst for olefin polymerization according to claim 10, wherein the catalyst component (C) is a compound in which the n' is 1.

12. A catalyst for olefin polymerization according to claim 11, wherein the catalyst component (C) is a compound in which the n' is 1 and the Y is —S—.

13. A catalyst for olefin polymerization according to claims 1, 2, 3, 4, 5, 6 or 7, wherein in the catalyst component (C), the $R^1$, $R^2$, $R^3$ and $R^4$ are each an alkyl group of 1 to 10 carbon atoms or an aryl group.

14. A catalyst for olefin polymerization according to claim 13, wherein in the catalyst component (C), the $R^1$, $R^2$, $R^3$ and $R^4$ are each a methyl, ethyl, n-propyl, isopropyl, n-butyl, isobutyl or t-butyl group.

15. A catalyst for olefin polymerization according to claim 12, wherein the catalyst component (C) is 2,2'-dihydroxy-3,3'-di-t-butyl-5,5'-dimethyldiphenyl sulfide.

16. A catalyst for olefin polymerization according to claim 8, wherein the catalyst component (C) is a compound represented by the general formula

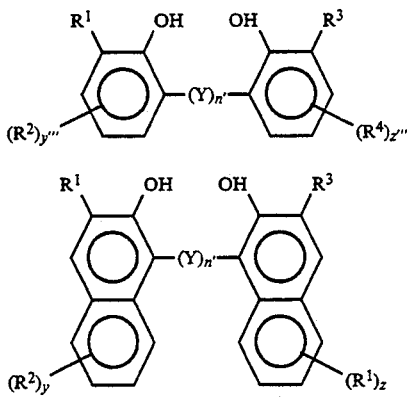

wherein y''' and z''' are 0 or an integer from 1 to 3.

17. A catalyst for olefin polymerization according to claim 9, wherein the catalyst component (C) is a compound in which the n' is 1.

18. A catalyst for olefin polymerization according to claim 16, wherein the catalyst component (C) is a compound in which the n' is 1.

19. A catalyst for olefin polymerization according to claim 8, wherein the catalyst component (C), the $R^1$, $R^2$, $R^3$ and $R^4$ are each an alkyl group of 1 to 10 carbon atoms or an aryl group.

* * * * *